(12) United States Patent
Takenaka

(10) Patent No.: US 8,446,634 B2
(45) Date of Patent: May 21, 2013

(54) COLOR CONVERSION APPARATUS, AND COLOR CONVERSION METHOD AND COMPUTER PROGRAM PRODUCT

(75) Inventor: Hirokazu Takenaka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 574 days.

(21) Appl. No.: 12/659,368

(22) Filed: Mar. 5, 2010

(65) Prior Publication Data

US 2010/0231935 A1    Sep. 16, 2010

(30) Foreign Application Priority Data

Mar. 11, 2009   (JP) .................................. 2009-057800

(51) Int. Cl.
*H04N 1/60*     (2006.01)
*H04N 1/46*     (2006.01)
*G03F 3/08*     (2006.01)
*G06K 9/00*     (2006.01)

(52) U.S. Cl.
USPC ............ 358/1.9; 358/518; 358/523; 358/529; 382/162; 382/167

(58) Field of Classification Search
USPC ................... 358/1.9, 518, 523, 529; 382/162, 382/167
See application file for complete search history.

(56) References Cited

U.S. PATENT DOCUMENTS

| 7,327,874 B2 | 2/2008 | Shibaki et al. |
| 8,134,763 B2 * | 3/2012 | Sawada ......................... 358/523 |
| 2004/0126009 A1 | 7/2004 | Takenaka et al. |
| 2009/0147313 A1 | 6/2009 | Miyagi et al. |

FOREIGN PATENT DOCUMENTS

| JP | 2003-143425 | 5/2003 |
| JP | 2004-032140 | 1/2004 |
| JP | 2005-348053 | 12/2005 |
| JP | 2006-345187 | 12/2006 |
| JP | 2008-160307 | 7/2008 |

OTHER PUBLICATIONS

Office Action for Corresponding Japanese patent application No. 2009-057800 dated Jan. 15, 2013.

* cited by examiner

*Primary Examiner* — Charlotte M Baker
(74) *Attorney, Agent, or Firm* — Harness, Dickey & Pierce, P.L.C.

(57) ABSTRACT

A first color conversion unit converts RGB signals from a line input unit to L*a*b* signals. A lightness range compression unit matches the lightness range of the input color signals with that of an output gamut. If the maximum saturation point on an input line is outside the output gamut, an input line correction unit corrects the point in such a manner that it is mapped onto the surface of the output gamut. If a near-surface determination unit determines that the corrected line is not located on the surface of the output gamut, an out-of-gamut mapping unit maps it onto the surface of the output gamut, whereas if it determines that the corrected line is located near the surface of the output gamut, the surface mapping unit maps all points on the surface of the output gamut. A second color conversion unit converts the mapped L*a*b* signals to CMYK signals.

13 Claims, 9 Drawing Sheets

COLOR CONVERSION APPARATUS, AND COLOR CONVERSION METHOD AND COMPUTER PROGRAM PRODUCT

CROSS-REFERENCE TO RELATED APPLICATIONS

The present application claims priority to and incorporates by reference the entire contents of Japanese Patent Application No. 2009-057800 filed in Japan on Mar. 11, 2009.

BACKGROUND OF THE INVENTION

1. Field of the Invention

The present invention relates to a color conversion apparatus that converts input color signals to color signals suitable for an output device and relates to a color conversion method and a computer program product.

2. Description of the Related Art

Conventionally, development of the color matching system (CMS) for image data, which is performed when color image data on a computer is output to a color output device such as a color printer, has been actively pursued. The basic function of the CMS is to quantitatively measure (colorimetry) colors of image data represented by RGB signals and convert them to color signals, corresponding to the image data, used for an output device. However, because the color reproduction range performed by electrophotography or an inkjet printer is extremely narrow compared with that produced on a display, it is impossible to faithfully reproduce colors on the display. Accordingly, a technology for mapping colors that cannot be reproduced by the output device into reproducible colors (also referred to as a gamut mapping technology) is known, and various gamut mapping methods have been proposed.

For example, with the color gamut mapping method and the color gamut mapping apparatus disclosed in Japanese Patent Application Laid-open No. 2004-032140, a color gamut is mapped in such a manner that saturated colors of the primary and secondary colors of an input device are matched with saturated colors of the primary and secondary colors of an output device. Considering this, a technology for mapping an edge line of color gamut of the primary and secondary colors of the input device in such a manner that the edge line is converted into a continuous and smooth line is disclosed.

Japanese Patent Application Laid-open No. 2005-348053 discloses a technology for mapping, using a color conversion apparatus, points inside an output gamut after matching lightness of the maximum saturation point with the output gamut while maintaining the saturation.

Japanese Patent Application Laid-open No. 2003-143425 discloses a technology for mapping, using an image processing apparatus, performed by obtaining a target mapping of the maximum saturation point of an input gamut and correcting the input gamut in such a manner that the lightness of the target mapping matches the lightness of the maximum saturation point.

With the above-described technologies, input data is converted to color signals independent of devices, for example, L*a*b* signals that are CIELab space signals, and the target mapping is determined on a CIELab space. Uniform color space can be represented by three components, i.e., lightness, saturation, and hue, and moreover, a color difference that is defined as a distance in a space conforms well to a color difference perceived by a human. Accordingly, it is possible to perform mapping that is natural for human perception.

For example, for colors that cannot be reproduced by the output device, a technology for reproducing colors having a minimum color difference obtained by varying, from among colors reproduced by the output device, the weight of differences in lightness, saturation, and hue is known (see Japanese Patent Application Laid-open No. H-10-84487). Furthermore, a technology for performing compression mapping is also known, where target points for projection are set on an achromatic axis or on a saturation axis of a hue identical to a hue of input color signals, and compression mapping is performed within gamut of an output device by making the hue constant for colors that are out of gamut of an output device (see Japanese Patent Application Laid-open No. H9-168097, or Japanese Patent Application Laid-open No. H9-18727). However, with such gamut mapping technologies, there is a problem in that underexposure or inversion phenomenon of saturation may occur.

FIG. 11 is a schematic diagram explaining a state in which points P1 and P2 of an input gamut on a boundary are mapped, by a conventional color conversion apparatus, onto a boundary of an output gamut in such a manner that color difference is minimized in a hue plane while keeping the hue. FIG. 12 is a schematic diagram explaining a state in which the points P1 and P2 of the input gamut on the boundary are mapped, by a conventional color conversion apparatus, onto a boundary of the output gamut and toward target points projected on an achromatic axis.

As shown in FIG. 11, points P1' and P2', which are target mapping, are overlapped and there is no difference in tone between points P1 and P2. Furthermore, as shown in FIG. 12, difference in tone remains for the target mapping points P1' and P2' because these two points are separate. However, in terms of a change in saturation (in the lateral direction), the relation between the points P1 and P2 on the boundary of the input gamut is saturation (P1)>saturation (P2), whereas the relation between the target mapping points P1' and P2' is saturation (P1')<saturation (P2'), resulting in inversion of the magnitude of saturation. This indicates the above-described problem of inversion phenomenon of saturation.

To solve this inversion phenomenon of saturation, the technology disclosed in Japanese Patent Application Laid-open No. 2004-032140 has been developed. Specifically, mapping is performed by obtaining the direction, in which the maximum saturation point of the input gamut is mapped onto the maximum saturation point of the output gamut, setting an intersection of the mapping direction and an achromatic axis as a target point for projection, and then mapping other points.

FIG. 13 is a schematic diagram explaining a technology of gamut mapping disclosed in Japanese Patent Application Laid-open No. 2004-032140. FIG. 14 is a schematic diagram illustrating a state in which gamut mapping similar to that used in FIG. 13 is used with respect to an output gamut that has a scooped shape in a shadow area.

As shown in FIG. 13, there is a difference in tone between the target mapping points P1' and P2', and no inversion phenomenon of saturation occurs; therefore, satisfactory gamut mapping is performed. However, in practice, the shape of the output gamut is sometimes not like the one that is shown in FIG. 13. Accordingly, assuming an output gamut having a scooped shape in a shadow area like that shown in FIG. 14, when gamut mapping similar to that used in FIG. 13 is performed, as shown in FIG. 14, there is a difference in tone between the target mapping points P1' and P2', and no inversion phenomena of saturation occurs; however, there is a risk of occurrence of tone jump because the difference in tone is too large. Thus, when an image is converted using a gamut mapping technology disclosed in Japanese Patent Application Laid-open No. 2004-032140, tones are considerably different between images before and after the conversion, which poses a problem.

SUMMARY OF THE INVENTION

It is an object of the present invention to at least partially solve the problems in the conventional technology.

According to an aspect of the present invention, there is provided a color conversion apparatus that converts an input color signal to a color signal within an output gamut that is reproducible by an image output device. The color conversion apparatus includes a line input unit that inputs an input line containing a plurality of input color signals on a line that connects either a white point or a black point and an arbitrary chromatic color point and; an input line correction unit that corrects the whole input line in such a manner that a maximum saturation point having a highest saturation on the input line is mapped onto a surface of the output gamut; and a surface mapping unit that maps, onto the surface of the output gamut, each of the input color signals contained in the corrected input line, regardless of whether the input color signals are located within or outside the output gamut.

According to another aspect of the present invention, there is provided a color conversion method of converting an input color signal to a color signal within an output gamut that is reproducible by an image output device. The color conversion method is performed by a color conversion apparatus including a line input unit, an input line correction unit, and a surface mapping unit. The color conversion method includes inputting, by the line input unit, an input line containing a plurality of input color signals on a line that connects either a white point or a black point and an arbitrary chromatic color point; correcting, by the input line correction unit, the whole input line in such a manner that a maximum saturation point having a highest saturation on the input line is mapped onto a surface of the output gamut; and mapping, by the surface mapping unit, on the surface of the output gamut, each of the input color signals contained in the corrected input line, regardless of whether the input color signals are located within or outside the output gamut.

According to still another aspect of the present invention, there is provided a computer program product that causes a computer to execute the method according the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a color conversion apparatus, a color conversion method and a program according to the present invention is described with reference to the accompanying drawings. In the embodiment, a description is given in a case where a color conversion apparatus is applied, in which a color signal, constituting an RGB image that is created on a personal computer (PC) or acquired by, e.g., a digital camera, is received, and is converted into a CMYK signal that can be output by an image output device such as a printer or the like. The color conversion apparatus according to the present invention is preferably used in an image processing apparatus, such as a color printer, a color facsimile machine, and a color hard copier, or used for software for a color printer operated with a personal computer or a workstation.

First Embodiment

Figure 1:
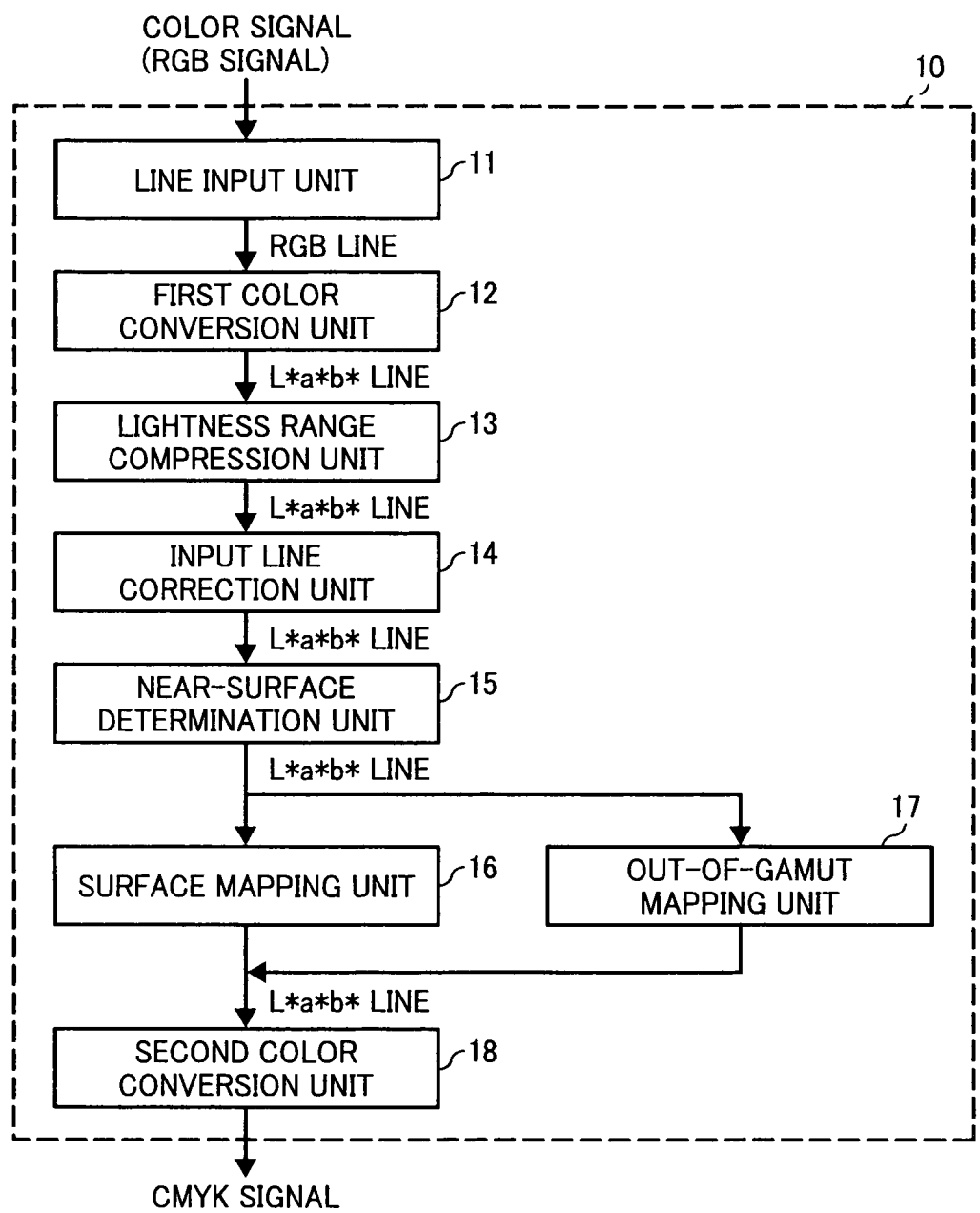
FIG. 1 is a block diagram illustrating the configuration of a color conversion apparatus according to a first embodiment of the present invention.
Figure 2:
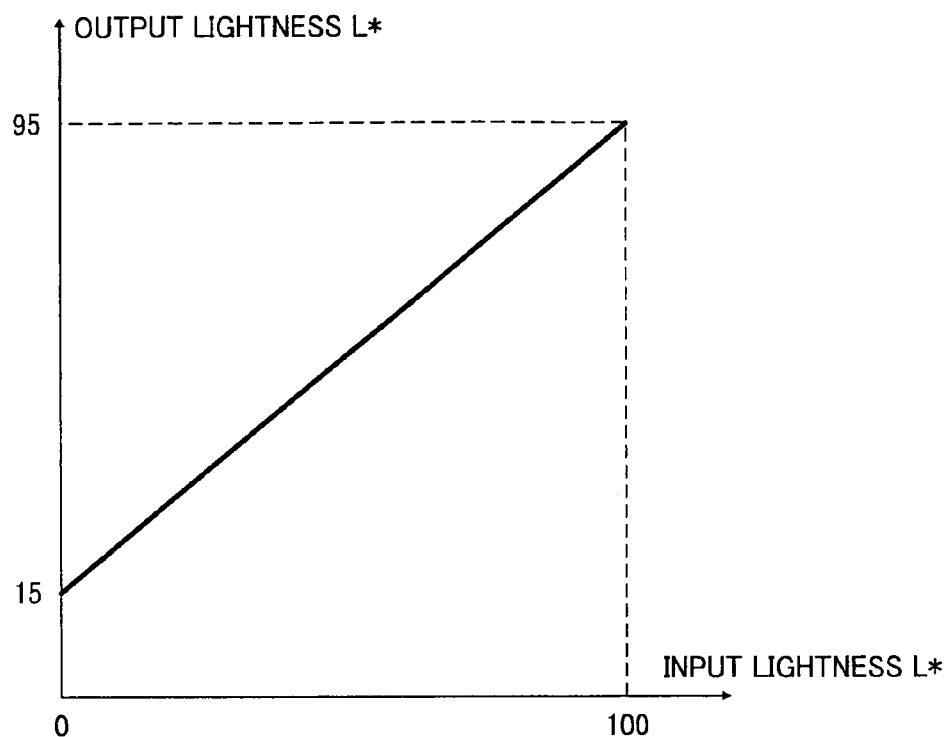
FIG. 2 is a schematic diagram illustrating an example of a one-dimensional table for lightness conversion.
Figure 3:
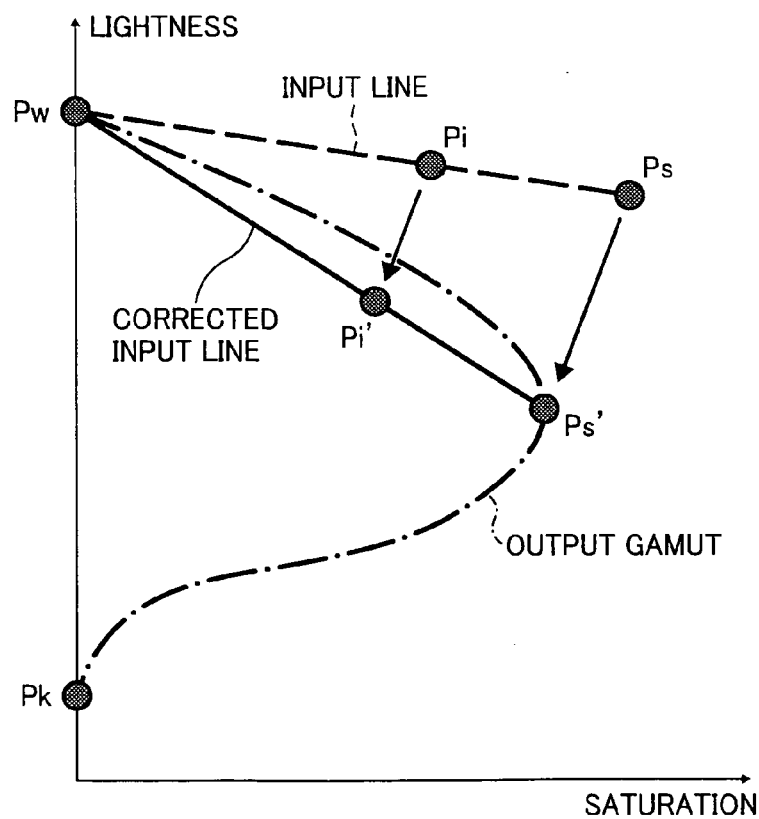
FIG. 3 is a schematic diagram illustrating a correction state performed by an input line correction unit in a case where an input line is composed of a point Pw, a point Pi, and a point Ps.
Figure 4:
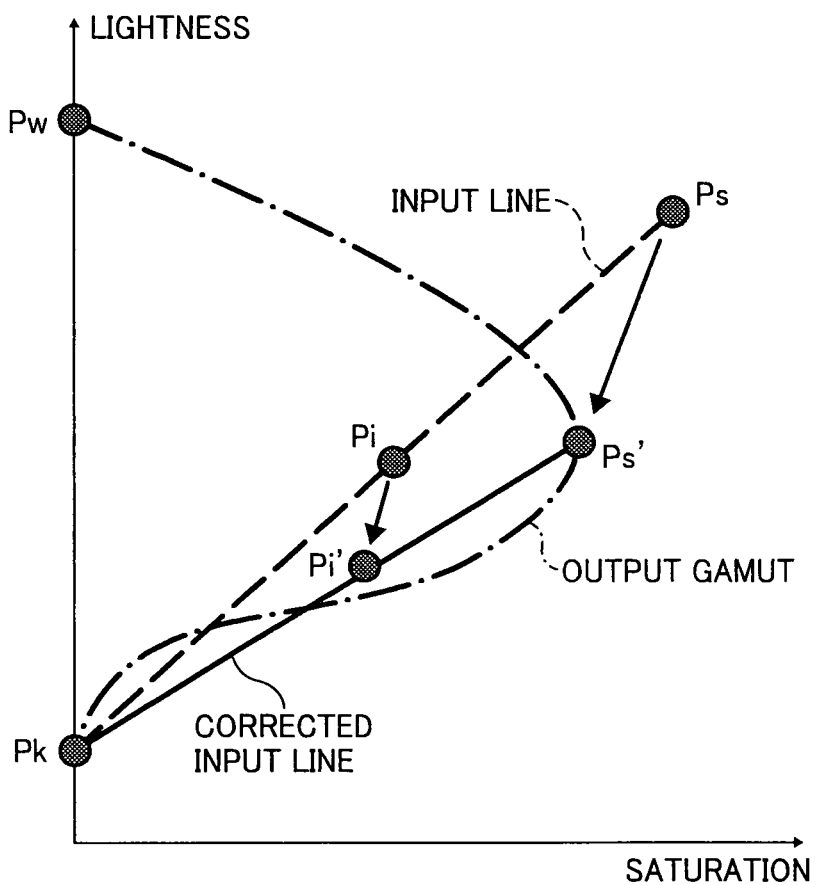
FIG. 4 is a schematic diagram illustrating a correction state performed by the input line correction unit in a case where the input line is composed of a point Pk, a point Pi, and a point Ps.
Figure 5:
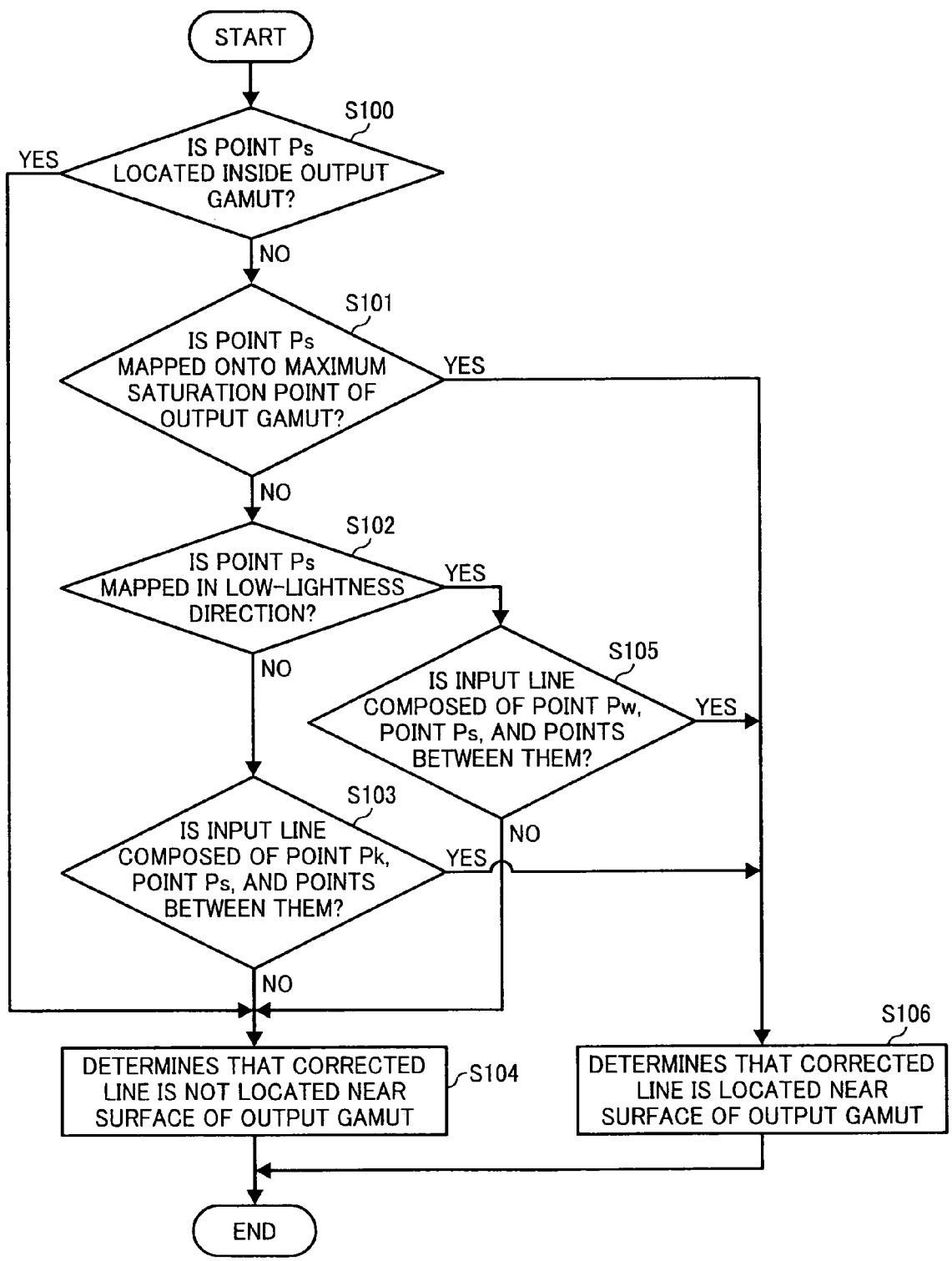
FIG. 5 is a flowchart of a determination process performed by a near-surface determination unit.
Figure 6:
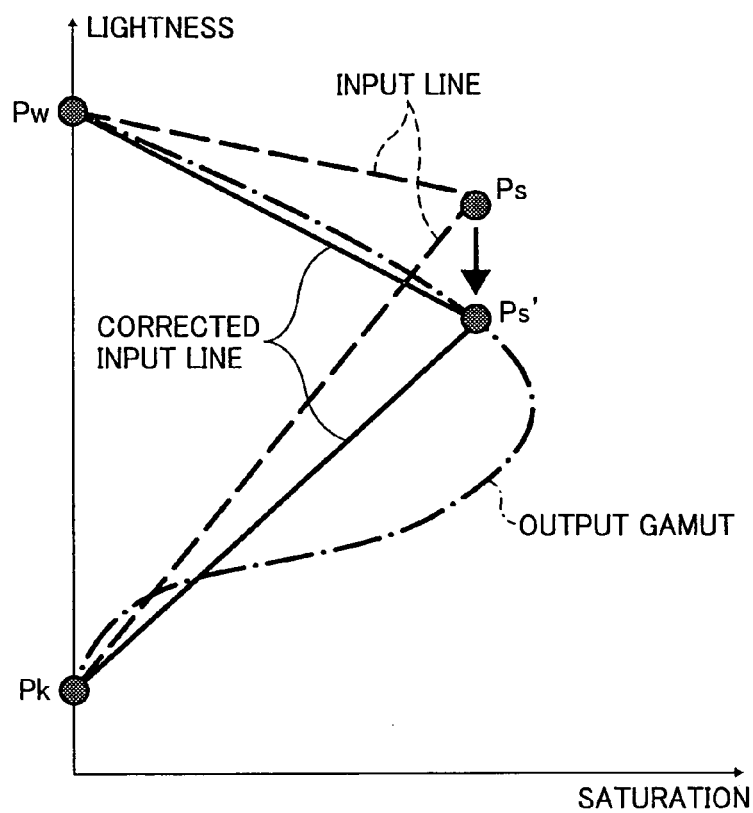
FIG. 6 is a schematic diagram illustrating a case where a point Ps of an input line composed of a point Pw, a point Ps, and a point Pk is mapped onto the low-lightness direction.
Figure 7:
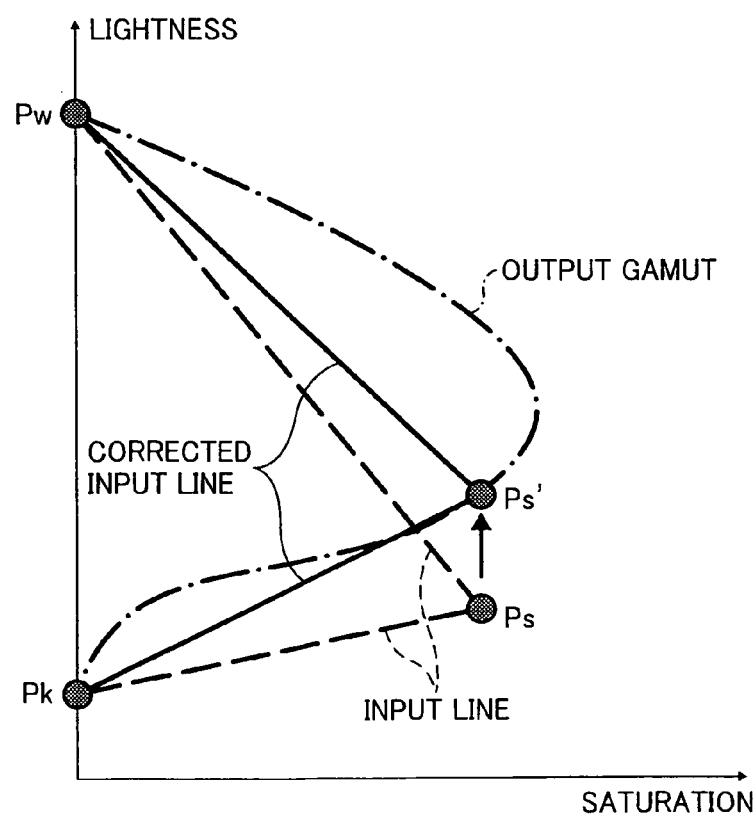
FIG. 7 is a schematic diagram illustrating a case where the point Ps of the input line composed of the point Pw, the point Ps, and the point Pk is mapped onto the high-lightness direction.
Figure 8:
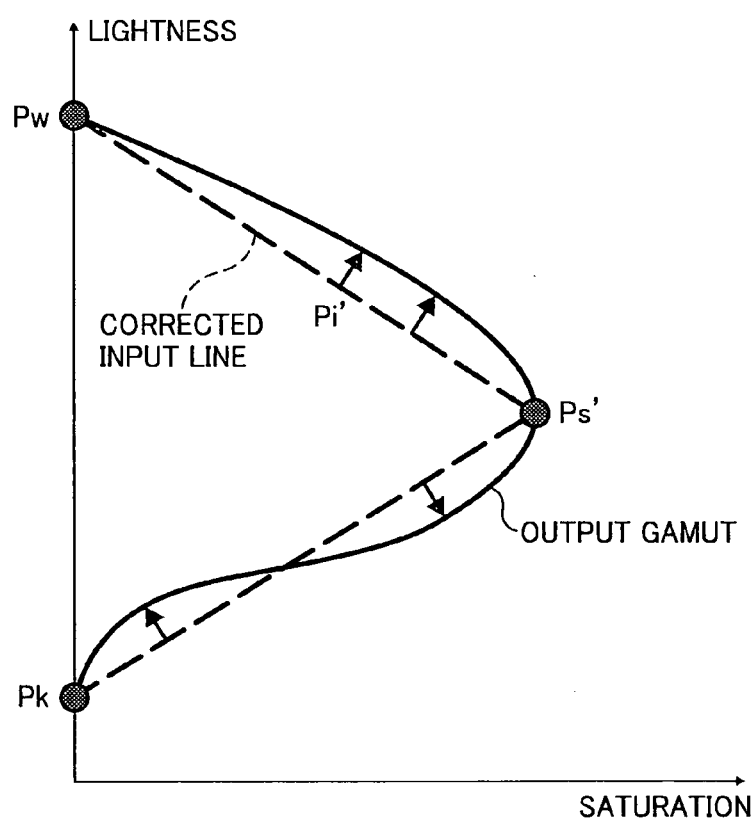
FIG. 8 is a schematic diagram illustrating a case where mapping onto a surface of an output gamut in the direction perpendicular to the corrected line is performed.
Figure 9:
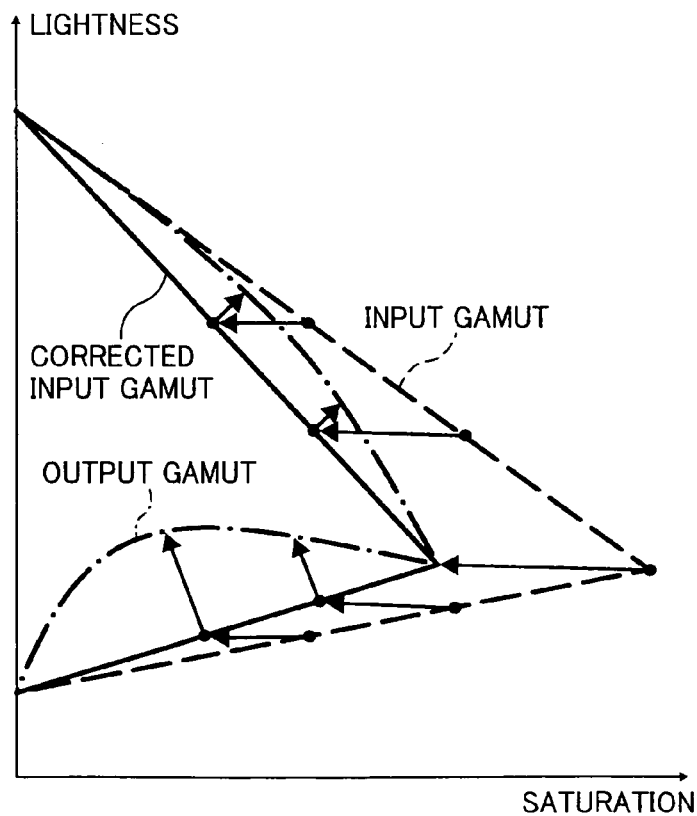
FIG. 9 is a schematic diagram illustrating that conventional problems can be solved by the present invention.

FIG. 1 is a block diagram illustrating the configuration of a color conversion apparatus according to a first embodiment of the present invention; FIG. 2 is a schematic diagram illustrating an example of a one-dimensional table for lightness conversion; FIG. 3 is a schematic diagram illustrating a correction state performed by an input line correction unit in a case where an input line is composed of a point Pw, a point Pi, and a point Ps; FIG. 4 is a schematic diagram illustrating a correction state performed by the input line correction unit in a case where the input line is composed of a point Pk, a point Pi, and a point Ps; FIG. 5 is a flowchart of a determination process performed by a near-surface determination unit; FIG. 6 is a schematic diagram illustrating a case where a point Ps of an input line composed of a point Pw, a point Ps, and a point Pk is mapped onto the low-lightness direction; FIG. 7 is a schematic diagram illustrating a case where the point Ps of the input line composed of the point Pw, the point Ps, and the point Pk is mapped onto the high-lightness direction; FIG. 8 is a schematic diagram illustrating a case where mapping onto a surface of an output gamut in the direction perpendicular to the corrected line is performed; and FIG. 9 is a schematic diagram illustrating that conventional problems can be solved by the present invention.

As shown in FIG. 1, color conversion apparatus 10 according to the present invention includes a line input unit 11, a first color conversion unit 12, a lightness range compression unit 13, an input line correction unit 14, a near-surface determination unit 15, a surface mapping unit 16, an out-of-gamut mapping unit 17, and a second color conversion unit 18.

The line input unit 11 inputs, to the first color conversion unit 12, an input line containing a plurality of color signals including input-color signals represented by RGB signals. First, the input-color signals are converted to HSL signals containing hue (H), saturation (S), and lightness (L). Here, symbol H representing hue takes values from 0 to 360, and symbol S representing saturation and symbol L representing lightness take values from 0 to 1, respectively. Subsequently, the input line is composed of the HSL signals having values of H and S corresponding to those of the input-color signals. Specifically, due to an RGB signal characteristic, among a set of color signals having values of H and S corresponding to those of the input-color signals, a color signal having the highest saturation, i.e., the maximum saturation point, obtained when it is converted to a color space perceptible to a human, such as L*a*b* space, is generally a color signal where L=0.5. Assuming the maximum saturation point as an endpoint of an input line, if the input-color signal is L>0.5, a set of color signals containing a white point (Pw), which is a point where L=1, an input point (Pi), and the maximum saturation point (Ps) is defined as an input line. If the input-color signal is not L>0.5, a set of color signals containing a black point (Pk), which is a point where L=0, an input point (Pi), and the maximum saturation point (Ps) is defined as an input line.

The first color conversion unit 12 converts the RGB signal (or HSL signal), which constitutes the input line, to an L*a*b* signal. Because the RGB signal created on the PC is usually an sRGB signal, the first color conversion unit 12 here converts the RGB signal to the L*a*b* signal in accordance with the definition of the sRGB signal.

The lightness range compression unit 13 compresses the lightness range of the input color signal in such a manner that the lightness range conforms to a lightness range of an output gamut. The range of lightness L* of the sRGB signal is from 0 to 100; however, the range of lightness L* of a printer is smaller than that of the sRGB signal. Here, the range of lightness L* of a printer is set from 15 to 95. Accordingly, the lightness range can be conformed to the output gamut by using the one-dimensional table for lightness conversion shown in FIG. 2. In the case of FIG. 2, the table for lightness conversion is given where the relation between before and after the lightness conversion is established by a linear expression; however the lightness conversion is not limited thereto. For example, lightness conversion having a different conversion characteristic from a linear expression can be performed.

If the maximum saturation point of the input line is located outside the output gamut, the input line correction unit 14 corrects the whole input line in such a manner that the maximum saturation point of the input line is mapped onto the surface of the output gamut. As shown in FIG. 3, a point Pw represents a white point, a point Pk represents a black point, a point Ps represents the maximum saturation point on the input line, and a point Pi represents an original input-color signal. Furthermore, Points Pi' and Ps' with "'" represent color signals after correction. The point Pi is located between the point Pw and the point Ps. The input line indicated by the dashed line in FIG. 3 is composed of the point Pw, the point Pi, and the point Ps. A correction process performed by the input line correction unit 14 is described with reference to FIG. 3.

First, the input line correction unit 14 determines whether the maximum saturation point Ps of the input line is outside the output gamut. If the point Ps is not located outside the output gamut, i.e., inside the output gamut, the input line correction unit 14 does not correct the input line. As shown in FIG. 3, if the point Ps is located outside the output gamut, the input line correction unit 14 maps the point Ps on the surface of the output gamut. Here, the input line correction unit 14 maps the point Ps in the direction in which saturation is maintained while maintaining the hue. However, when it is impossible to maintain the saturation, i.e., when the maximum saturation point Ps is greater than a maximum saturation point on the output gamut with the same hue as that of the maximum saturation point Ps, the maximum saturation point Ps is mapped onto the maximum saturation point Ps' on the output gamut with the same hue.

Subsequently, points other than the point Ps contained in the input line are corrected. Correction is performed in accordance with an amount of change in the point Ps mapped by keeping continuity of the input line without moving both the white point Pw and the black point Pk. Specifically, Equations (1) and (2) below are used:

$$C^*(Pi') = C^*(Pi) \times C^*(Ps')/C^*(Ps) \tag{1}$$

$$L^*(Pi') = L^*(Pi) + \{L^*(Ps') - L^*(Ps)\} \times \{L^*(Pi) - L^*(Pw)\} / \{L^*(Ps) - L^*(Pw)\} \tag{2}$$

The saturation $C^*(Pi)$ of the input point Pi is converted to $C^*(Pi')$, and lightness $L^*(Pi)$ of the input point Pi is converted to $L^*(Pi')$. Here, a case in which the point Pi is located between the point Ps and the point Pw is represented by the above described Equation. When the point Pi is located between the point Ps and the point Pk (a case shown in FIG. 4), Equation (3) is used, where $L^*(Pw)$ in Equation (2) is replaced by $L^*(Pk)$.

As shown in FIG. 4, if the maximum saturation point of the input line is located outside the output gamut, the input line correction unit 14 included in the color conversion apparatus 10 shown in FIG. 1 corrects the whole input line in such a manner that the maximum saturation point of the input line is mapped onto the surface of the output gamut. In FIG. 4, a point Pw represents a white point, a point Pk represents a black point, a point Ps represents the maximum saturation point of the input line, and a point Pi represents the original input-color signal. Furthermore, Points Pi' and Ps' represent color signals after correction. The point Pi is located between the point Pk and the point Ps. The input line indicated by the dashed line in FIG. 4 is composed of the point Pk, the point Pi, and the point Ps. A correction process shown in FIG. 4 performed by the input line correction unit 14 is described.

The input line correction unit 14 determines whether the maximum saturation point Ps of the input line is located outside the output gamut. If the maximum saturation point Ps is not located outside the output gamut, i.e., within the output gamut, the input line correction unit 14 does not correct the input line. As shown in FIG. 4, if the point Ps is located outside the output gamut, the input line correction unit 14 maps the point Ps onto the surface of the output gamut. Here, the input line correction unit 14 maps the point Ps in the direction in which saturation is maintained while maintaining the hue. However, when it is impossible to maintain the saturation, i.e., when the maximum saturation point Ps is greater than the maximum saturation point on the output gamut with the same hue as that of the maximum saturation point Ps, the maximum saturation point Ps is mapped onto the maximum saturation point Ps' on the output gamut with the same hue.

Subsequently, points other than the point Ps contained in the input line are corrected. Correction is performed in accordance with the amount of change in the point Ps mapped by keeping continuity of the input line without moving the white point Pw and the black point Pk. Specifically, Equation (1) given above and Equation (3) below are used.

$$L^*(Pi')=L^*(Pi)+\{L^*(Ps')-L^*(Ps)\}\times\{L^*(Pi)-L^*(Pk)\}/\{L^*(Ps)-L^*(Pk)\} \quad (3)$$

The saturation $C^*(Pi)$ of the input point Pi is converted to $C^*(Pi')$, and the lightness $L^*(Pi)$ of the input point Pi is converted to $L^*(Pi')$.

The near-surface determination unit 15 determines whether the input line corrected by the input line correction unit 14 (hereinafter, "corrected line") is located near the surface of the output gamut. As shown in FIG. 5, the near-surface determination unit 15 determines whether the point Ps is located inside the output gamut as a first determination (Step S100). A case in which the condition is true at Step S100 indicates a case where the point Ps is originally located inside the output gamut and correction is not performed by the input line correction unit 14, and the near-surface determination unit 15 determines that the corrected line is not located near the surface of the output gamut (Step S104).

If the point Ps is not located inside the output gamut at Step S100, the near-surface determination unit 15 performs a second determination by proceeding to Step S101. Specifically, the near-surface determination unit 15 determines whether the point Ps is mapped onto the maximum saturation point of the output gamut. If the condition is true at Step S101, the near-surface determination unit 15 determines that the corrected line is located near the surface of the output gamut (Step S106), which is a case like that illustrated in FIG. 3 and FIG. 4.

If the near-surface determination unit 15 determines the conditions to be false at the second determination at Step S101, the near-surface determination unit 15 determines, at a third determination, whether the point Ps is mapped in the low-lightness direction at Step S102. A case in which the condition is true at Step S102 indicates, for example, as shown in FIG. 6, a case in which the point Ps of the input line is mapped in the low-lightness direction, and the near-surface determination unit 15 performs a fourth determination at Step S105.

In the fourth determination, the near-surface determination unit 15 determines whether the input line is composed of the point Pw, the point Ps, and points between them. If the condition is true at Step S105, the near-surface determination unit 15 determines that the corrected line is located near the surface of the output gamut (Step S106). If the condition is false at Step S105, the near-surface determination unit 15 determines that the corrected line is not located near the surface of the output gamut (Step S104). Accordingly, as shown in FIG. 6, it is found that the line connecting the point Pw and the point Ps is located near the surface of the output gamut, whereas the line connecting the point Pk and the point Ps is not located near the surface of the output gamut.

A case of determination being false at the third determination at Step S102 indicates, for example, as a case like that shown in FIG. 7, a case in which the point Ps of the input line is mapped in the high-lightness direction, and the near-surface determination unit 15 performs a fifth determination at Step S103. At the fifth determination, the near-surface determination unit 15 determines whether the input line is composed of the point Pk, the point Ps, and points between them. If the condition is true at Step S103, the near-surface determination unit 15 determines that the corrected line is located near the surface of the output gamut (Step S106). If the condition at Step S103 is false, the near-surface determination unit 15 determines that the corrected line is not located near the surface of the output gamut (Step S104). Accordingly, as shown in FIG. 7, it is found that the line connecting the point Pk and the point Ps is located near the surface of the output gamut, whereas the line connecting the point Pw and the point Ps is not located near the surface of the output gamut.

With the determination process performed by the near-surface determination unit 15 in this way, it is determined whether the corrected line is located near the surface of the output gamut. The next process differs depending on this determination result. Specifically, if the corrected line is located near the output gamut (Step S106), the surface mapping unit 16 shown in FIG. 1 receives an input. In contrast, if the corrected line is not located near the output gamut (Step S104), the out-of-gamut mapping unit 17 shown in FIG. 1 receives an input.

The out-of-gamut mapping unit 17 determines whether each of the points constituting the corrected line is located outside the output gamut. If the points are located inside the output gamut, mapping needs not to be performed. However, if the points are located outside the output gamut, the mapping onto the surface of the output gamut is required. A method in which mapping is performed onto a point where color difference is minimized in a hue plane while maintaining the hue is used as a mapping method; however, other mapping methods can be used.

The surface mapping unit 16 performs a mapping process with respect to all points on the surface of the output gamut without determining whether each of the points constituting the corrected line is located outside the output gamut. If the corrected line is located near the surface of the output gamut, the input line before correction is usually located outside the output gamut; therefore, the final target mapping is preferably close to the output gamut. Accordingly, the mapping onto the surface of the output gamut is performed, regardless of whether the corrected line is located outside the output gamut. A preferable method of mapping is the one performed in the direction perpendicular to the corrected line while maintaining the hue. For example, if the corrected line is almost a straight line, as shown in FIG. 8, it is possible to use a method of performing mapping in the direction perpendicular to the straight line connecting the point Ps and the point Pw (or, point Pk) while maintaining the hue. The arrows shown in FIG. 8 indicate the mapping direction.

The second color conversion unit 18 converts the mapped L*a*b* signal to a CMYK signal for outputting an image. For the conversion, it is possible to use a color conversion technology using an ICC profile that is a standard color management system.

Figure 14:
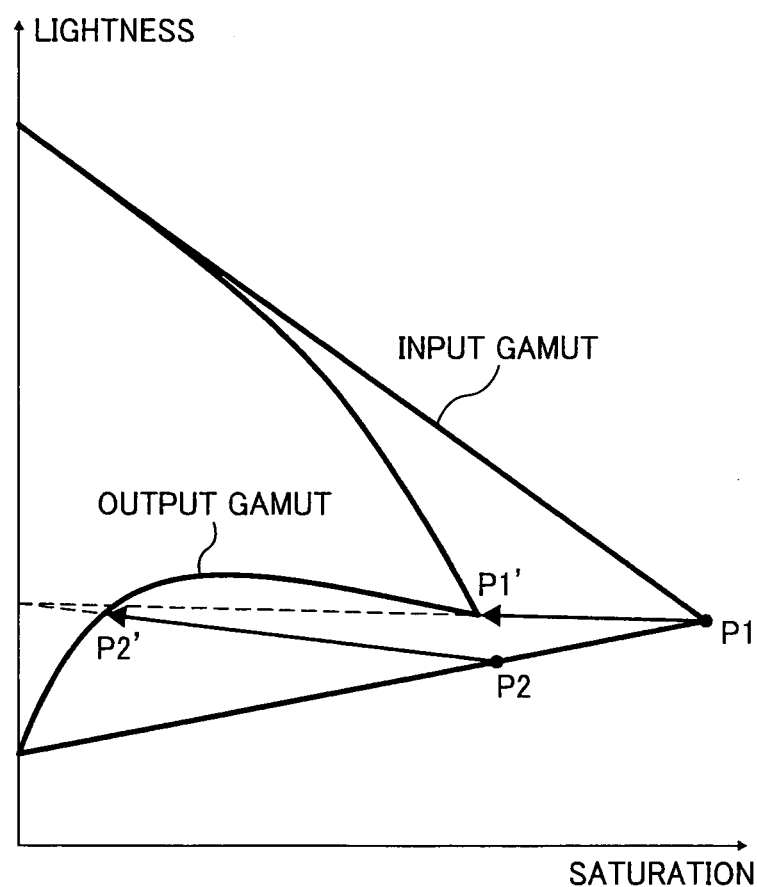
FIG. 14 is a schematic diagram illustrating a state in which gamut mapping similar to that used in FIG. 13 is used with respect to an output gamut that has a scooped shape in a shadow area.

According to the first embodiment, with the color conversion apparatus 10 having such a configuration, the input color signal (RGB signal) can be converted to the color signal (CMYK signal) for outputting an image. In particular, the input line correction unit 14 and the surface mapping unit 16 are the features of the present invention. The input line correction unit 14 performs the correction process to avoid the occurrence of an inversion phenomenon of saturation on the input line. The surface mapping unit 16 performs the mapping onto the surface of the output gamut while maintaining the grayscale characteristic. This makes it possible to perform an optimum gamut mapping. As a result, there is no inversion phenomenon of saturation; therefore, color conversion in which the tone is maintained can be performed. Accordingly, even when a tone cannot be suitably maintained using the conventional technology shown in FIG. 14, it is possible to perform mapping onto the surface of the output gamut like the arrows shown in FIG. 9, which makes it possible to suitably maintain the tone.

Second Embodiment

In the first embodiment described above, as a method of mapping the maximum saturation point Ps of the input line, the input line correction unit 14 performs the mapping in the direction where saturation is maintained while maintaining the hue. As a result, color conversion in which the tone can be maintained is implemented. However, the present invention is not limited to such a color conversion process; various mapping methods can be used.

For example, in a second embodiment, it is possible to use a method of mapping onto a point on the output gamut where a color difference is minimized in a hue plane while maintaining the hue or a method of simply mapping onto a point on the output gamut where a color difference is minimized without maintaining the hue. Furthermore, if the maximum saturation point Ps on the input line corresponds to the maximum saturation point on the input gamut with the same hue and if the input line corresponds to a boundary of the input gamut, it is effective to use a method of always mapping the point Ps onto the maximum saturation point on the output gamut.

As described above, according to the second embodiment, it is possible to perform color conversion in which the whole area of the output gamut can be used without waste, no inversion phenomenon of saturation occurs, and the tone is maintained.

Third Embodiment

Figure 10:
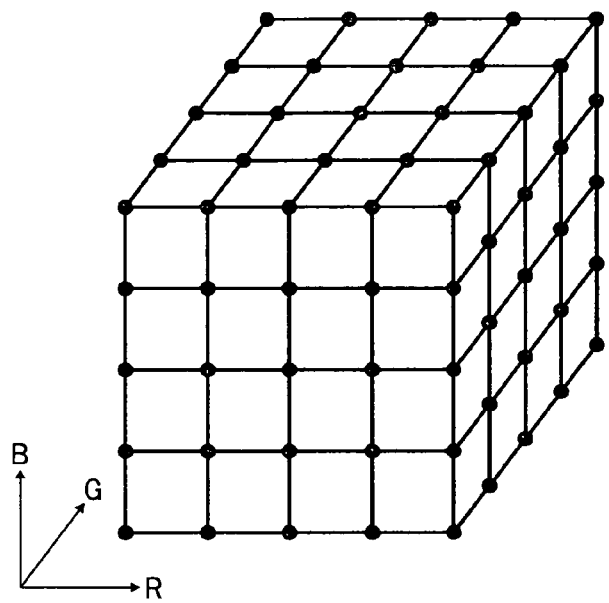
FIG. 10 is a schematic diagram illustrating an example of a color conversion table according to a third embodiment.
Figure 11:
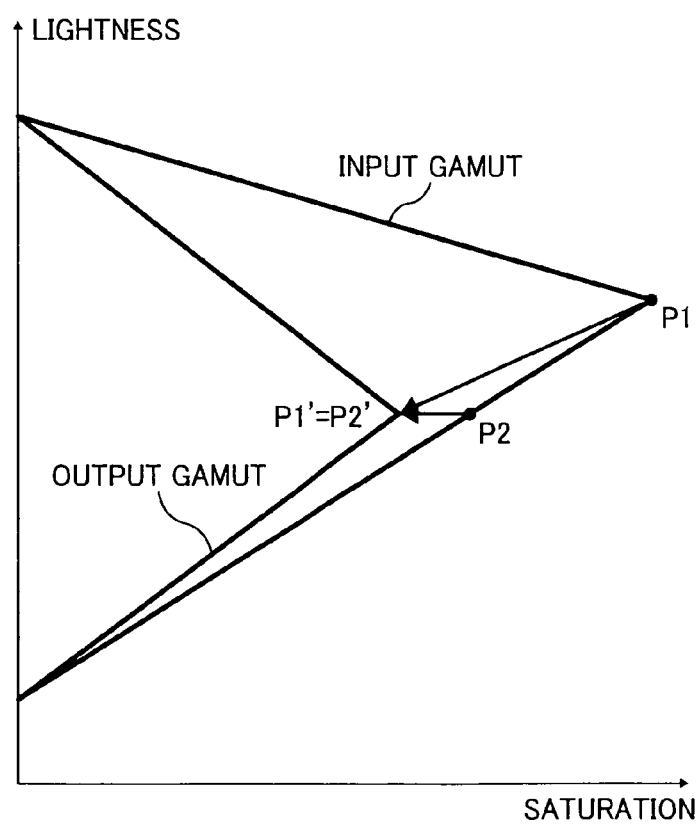
FIG. 11 is a schematic diagram explaining a state in which points P1 and P2 of an input gamut on a boundary are mapped, by a conventional color conversion apparatus, onto a boundary of an output gamut in such a manner that color difference is minimized in a hue plane while keeping the hue.
Figure 12:
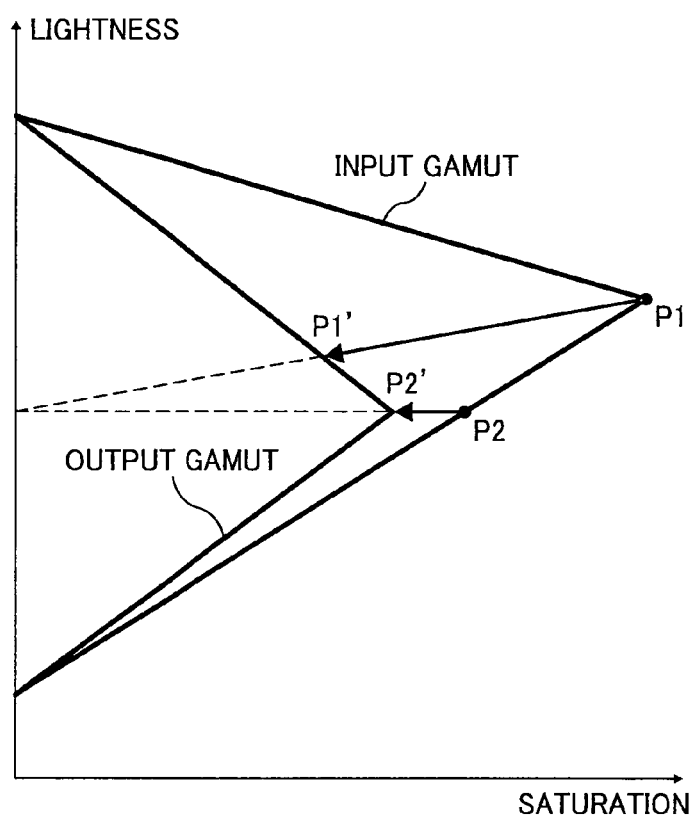
FIG. 12 is a schematic diagram explaining a state in which the points P1 and P2 of the input gamut on the boundary are mapped, by a conventional color conversion apparatus, onto a boundary of the output gamut and toward target points projected on an achromatic axis.
Figure 13:
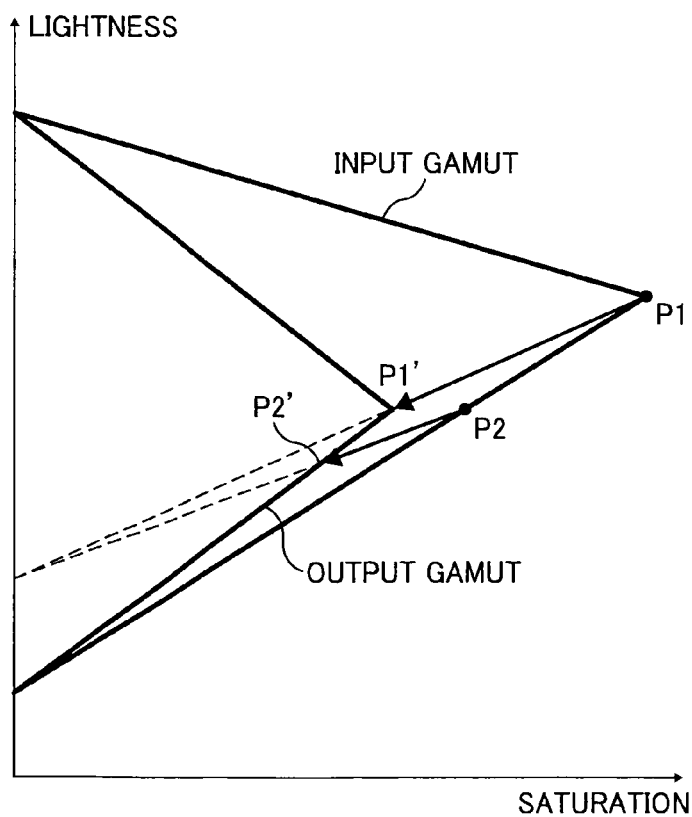
FIG. 13 is a schematic diagram explaining a technology of gamut mapping disclosed in Japanese Patent Application Laid-open No. 2004-032140.

FIG. 10 is a schematic diagram illustrating an example of a color conversion table according to a third embodiment. In the third embodiment, a method of creating the color conversion table related to the color conversion method is described.

In the first embodiment described above, when the RGB image is input, the input line is set for each pixel, and various processes are performed to convert the RGB signal to the CMYK signal. However, with this method, when converting a large image, there is a possibility of requiring an extremely long processing time. Because of this, with the method of creating the color conversion table in the third embodiment, a color conversion process can be performed within a short period of time by creating in advance a color conversion table in which the conversion relation between an RGB signal and a CMYK signal is described and by performing an interpolation calculation by referring to the color conversion table when an image is converted.

In a method of creating the color conversion table according to the third embodiment, first, for 24 hues of hue (H)=0, 15, 30, . . . , 330, 345 and for nine levels of saturation (S)=0, 1/8, 2/8, 3/8, 4/8, 5/8, 6/8, 7/8, 1, input lines each containing nine points are created: nine points set by nine levels of lightness (L)=0, 1/16, 2/16, 3/16, . . . , 7/16, 0.5 and nine points set by nine levels of lightness (L)=0.5, 9/16, 10/16, . . . , 15/16, 1. In other words, a highlight line and a shadow line, which are composed of points with lightness (L) to which each of the H value and the S value are distributed, are created.

Subsequently, using the color conversion apparatus 10 shown in FIG. 1 described in the first embodiment, the HSL signals constituting all lines are converted to CMYK signals. The relation between input RGB signals corresponding to the HSL signals and the output CMYK signals can be used for the color conversion table; however, here, as shown in FIG. 10, the CMYK signals respectively corresponding to points obtained by uniformly dividing a RGB color space are used as a color conversion table. Accordingly, the CMYK signal values respectively corresponding to the points obtained by uniformly divided the RGB color space are obtained by using CMYK signal values respectively corresponding to points obtained by dividing HSL color space. The CMYK signal values can be obtained by using an interpolation calculation process. The interpolation calculation process, which is used for performing the color conversion using the color conversion table created in the above-described manner, includes cubic interpolation, triangular prism interpolation, tetrahedron interpolation, and the like.

As described above, according to the third embodiment, the color conversion can be performed in a short period of time by creating the color conversion table and using it. Furthermore, it is possible to perform mapping, in which the tone is maintained, with respect to the points between the maximum saturation point and either the white point or the black point. Accordingly, it is possible to perform color conversion in which no inversion phenomenon of saturation occurs and the tone is maintained.

Fourth Embodiment

To implement the functions according to the first, second, and third embodiments, the present invention also includes an embodiment that is implemented by providing an apparatus or a computer arranged in a system that is used for operating various devices with program codes of software used for implementing the above-described functions and by operating the various devices on the basis of the programs stored in the computer (CPU or MPU) in the system or the apparatus.

In such a case, the program codes of the software implement the functions described in the first, second, and third embodiments. The program codes themselves and a memory medium, storing therein such program codes used for providing the program codes for the computer, constitute the present invention. The memory medium that can be used for storing the program codes includes, for example, a floppy (registered trademark) disk, a hard disk, an optical disk, a magneto-optic disk, a compact disk read only memory (CD-ROM), a magnetic tape, a nonvolatile memory card, a read only memory (ROM), and the like.

Furthermore, embodiments of the present invention includes program codes not only in a case where functions described in the first, second, and third embodiments can be implemented by executing provided program codes by a computer, but also in a case where functions described in the first, second, and third embodiments can be implemented by the program codes acting with an operating system (OS) working on a computer or with other application software.

Moreover, the present invention includes a case where the functions described in the first, second, and third embodiments are implemented by a process, in which, after the provided program codes are stored in a memory mounted on a function expansion board in a computer or a function expansion unit connected to a computer, a CPU (central processing unit) mounted on the function expansion board or the function expansion unit executes a part or the whole of the actual processes based on instructions of the program codes.

According to an aspect of the present invention, it is possible to perform mapping, for points located between the maximum saturation point and either a white point or a black point, in which a grayscale characteristic is maintained, and to perform color conversion in which a grayscale characteristic is maintained without inverse saturation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color conversion apparatus configured to converts an input color signal to a color signal within an output gamut that is reproducible by an image output device, the color conversion apparatus comprising:
a line input unit configured to input an input line containing a plurality of input color signals on a line that connects either a white point or a black point and an arbitrary chromatic color point and;
an input line correction unit configured to corrects the whole input line in such a manner that a maximum saturation point having a highest saturation on the input line is mapped onto a surface of the output gamut;
a surface mapping unit configured to maps, onto the surface of the output gamut, each of the input color signals contained in the corrected input line; and
a near-surface determination unit configured to determine whether the corrected input line corrected by the input line correction unit or each of points constituting the corrected input line is located near the surface of the output gamut, wherein
the surface mapping unit is configured such that when the near-surface determination unit determines that the corrected input line or each of the points constituting the corrected input line is located near the surface of the output gamut, the surface mapping unit maps each of the input color signals contained in the corrected input line onto the surface of the output gamut.

2. The color conversion apparatus of claim 1, wherein the surface mapping unit maps, onto the surface of the output gamut, each of the input color signals contained in the corrected input line, regardless of whether the input color signals are located within or outside the output gamut.

3. The color conversion apparatus according to claim 1, further comprising an out-of-gamut mapping unit configured to map a color signal outside the output gamut onto the surface of the output gamut and maintains a color signal within the output gamut, wherein
the out-of-gamut mapping unit is configured such that when the near-surface determination unit determines that the corrected input line or each of the points constituting the corrected input line is not located on the surface of the output gamut, the out-of-gamut mapping unit determines whether the corrected input line or each of the points constituting the corrected input line is located outside the output gamut, and when the corrected input line or each of the points constituting the corrected input line is located outside the output gamut, the out-of-gamut mapping unit performs the mapping.

4. The color conversion apparatus according to claim 1, wherein the surface mapping unit is configured to performs mapping onto the surface of the output gamut in the direction perpendicular to a straight line that connects a maximum saturation point on the surface of the output gamut with a same hue as that of the maximum saturation point on the input line and either a white point or a black point of the output gamut.

5. The color conversion apparatus according to claim 1, wherein the input line contains a plurality of input color signals on a line that connects either a white point or a black point of an input gamut and a maximum saturation point of the input gamut of an arbitrary hue.

6. The color conversion apparatus according to claim 1, wherein the input line correction unit is configured to corrects the whole input line in such a manner that the maximum saturation point on the input line is mapped onto a maximum saturation point on the surface of the output gamut with a same hue as that of the maximum saturation point on the input line.

7. The color conversion apparatus according to claim 1, wherein the input line correction unit is configured to correct the whole input line in such a manner that the maximum saturation point on the input line is mapped onto a maximum saturation point on the surface of the output gamut with a same hue and saturation as those of the maximum saturation point on the input line.

8. The color conversion apparatus according to claim 1, wherein the input line correction unit is configured to correct the whole input line in such a manner that the maximum saturation point on the input line is mapped onto a point on the surface of the output gamut with a same hue as that of the maximum saturation point on the input line and at which a color difference is minimized.

9. The color conversion apparatus according to claim 1, wherein the input line correction unit is configured to corrects the whole input line in such a manner that the maximum saturation point on the input line is mapped onto a point on the surface of the output gamut at which a color difference is minimized.

10. A color conversion method of converting an input color signal to a color signal within an output gamut that is reproducible by an image output device, the color conversion method being performed by a color conversion apparatus including a line input unit, an input line correction unit, and a surface mapping unit, the color conversion method comprising:
inputting, by the line input unit, an input line containing a plurality of input color signals on a line that connects either a white point or a black point and an arbitrary chromatic color point;
correcting, by the input line correction unit, the whole input line in such a manner that a maximum saturation point having a highest saturation on the input line is mapped onto a surface of the output gamut; and
mapping, by the surface mapping unit, on the surface of the output gamut, each of the input color signals contained in the corrected input line,
wherein the color conversion apparatus further includes a near-surface determination unit,
the color conversion method further includes determining, by the near-surface determination unit, whether the corrected input line corrected by the input line correction unit or each of points constituting the corrected input line is located near the surface of the output gamut, and
only when the near-surface determination unit determines that the corrected input line or each of the points constituting the corrected input line corrected by the input line correction unit is located near the surface of the output gamut, the surface mapping unit performs mapping of each of the input color signals contained in the corrected input line onto the surface of the output gamut.

11. The color conversion method of claim 10, wherein the mapping includes mapping, by the surface mapping unit, on the surface of the output gamut, each of the input color signals contained in the corrected input line, regardless of whether the input color signals are located within or outside the output gamut.

12. A computer program product comprising a non-transitory computer-usable medium having computer-readable program codes embodied in the medium for converting an input color signal to a color signal within an output gamut that is reproducible by an image output device, performed in a color conversion apparatus including a line input unit, an input line correction unit, and a surface mapping unit, the program codes when executed causing a computer to execute:

inputting, by the line input unit, an input line containing a plurality of input color signals on a line that connects either a white point or a black point and an arbitrary chromatic color point;

correcting, by the input line correction unit, the whole input line in such a manner that a maximum saturation point having a highest saturation on the input line is mapped onto a surface of the output gamut; and mapping, by the surface mapping unit, on the surface of the output gamut, each of the input color signals contained in the corrected input line, wherein the color conversion apparatus further includes a near-surface determination unit, the program codes when executed further cause the computer to execute determining, by the near-surface determination unit, whether the corrected input line corrected by the input line correction unit or each of points constituting the corrected input line is located near the surface of the output gamut, and the program codes when executed further cause the computer to execute the mapping such that only when the near-surface determination unit determines that the corrected input line or each of the points constituting the corrected input line corrected by the input line correction unit is located near the surface of the output gamut, the surface mapping unit performs mapping of each of the input color signals contained in the corrected input line onto the surface of the output gamut.

13. The computer program product of claim 12, wherein the mapping includes mapping, by the surface mapping unit, on the surface of the output gamut, each of the input color signals contained in the corrected input line, regardless of whether the input color signals are located within or outside the output gamut.

* * * * *